Figure 1:
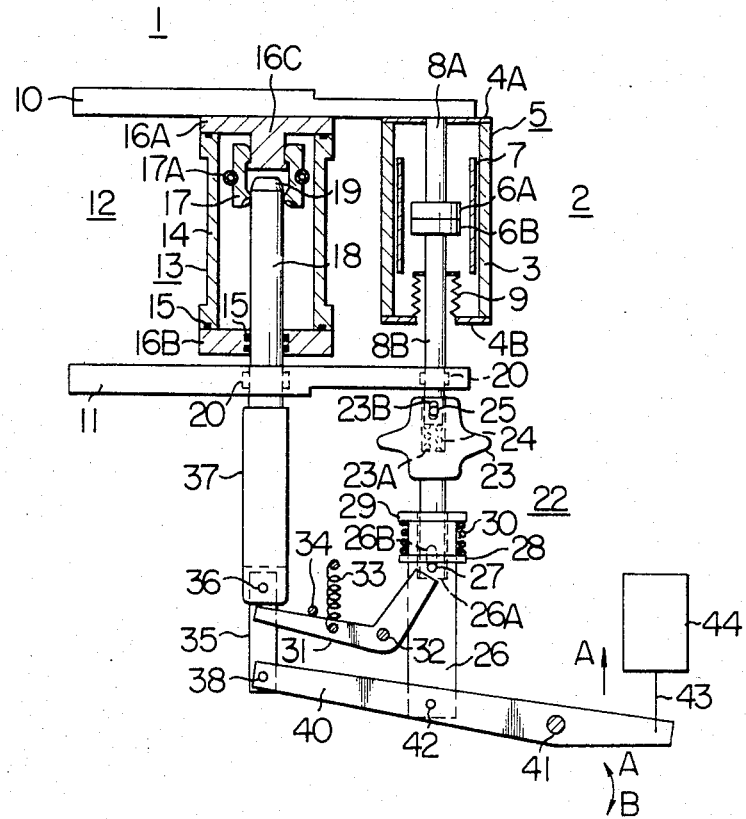

United States Patent [19]

Gotoh et al.

[11] Patent Number: 4,538,039

[45] Date of Patent: Aug. 27, 1985

[54] COMPOSITE CIRCUIT BREAKER

[75] Inventors: Yoshitomo Gotoh, Hitachi; Kiyofumi Iwamoto, Ibaraki, both of Japan

[73] Assignee: Hitachi, Ltd., Tokyo, Japan

[21] Appl. No.: 484,894

[22] Filed: Apr. 14, 1983

[30] Foreign Application Priority Data

Apr. 19, 1982 [JP] Japan ................................ 57-63895

[51] Int. Cl.³ ...................... H01N 33/66; H01N 33/16
[52] U.S. Cl. ............................. 200/144 B; 200/146 R; 200/144 AP
[58] Field of Search ......... 200/146 R, 144 AP, 144 B

[56] References Cited

U.S. PATENT DOCUMENTS

| 2,792,476 | 5/1957 | Cushing | 200/146 A |
|---|---|---|---|
| 2,878,402 | 3/1959 | Kohn | 200/146 R |
| 2,897,322 | 7/1959 | Reece | 200/146 R |
| 3,017,480 | 1/1962 | Klaassen | 200/146 R |
| 3,560,682 | 2/1971 | Kohler et al. | 200/146 R |
| 3,824,359 | 7/1974 | Date | 200/144 B |
| 4,383,150 | 5/1983 | Cromer et al. | 200/144 AP |

FOREIGN PATENT DOCUMENTS

| 293862 | 10/1929 | United Kingdom | 200/144 B |
|---|---|---|---|
| 562994 | 7/1944 | United Kingdom | 200/144 AP |
| 771747 | 10/1980 | U.S.S.R. | 200/144 AP |

*Primary Examiner*—Robert S. Macon
*Attorney, Agent, or Firm*—Antonelli, Terry & Wands

[57] ABSTRACT

A composite circuit breaker comprises a closing switch part disposed between a pair of conductors at a position relatively near a load apparatus, a vacuum circuit-breaking part disposed between the conductors at a position adjacent to the closing switch part but relatively remote from the load apparatus, an operating mechanism operating the making and breaking operation of the closing switch part and vacuum circuit-breaking part, and a delaying mechanism including a delaying lever for delaying the making and breaking operation of the vacuum circuit-breaking part actuated by the operating mechanism relative to that of the closing switch part operated by the operating mechanism.

17 Claims, 4 Drawing Figures

COMPOSITE CIRCUIT BREAKER

The present relates to a composite circuit breaker comprising a vacuum circuit-breaking part for circuit breaking purpose and a closing switch part for circuit making and current conducting purpose arranged in parallel with the vacuum circuit-breaking part.

A conventional vacuum circuit-breaker is compact in size and has satisfactory circuit-breaking performance; however, the conventional vacuum circuit-breaker has a number of disadvantages when used to handle a large current because of a butt contact arrangement of the electrodes:

(1) The butt-contact electrodes having a high electric resistance generate a large quantity of heat when load current flows therethrough. Therefore, the external terminals must be sized to be large enough to permit full dissipation of the heat.

(2) Chattering of the electrodes impinging against each other in the circuit-making mode for conduction of a short-circuit current tends to cause welding of the electrodes to each other. To avoid such welding, the material of the electrodes must be so selected that the electrodes are not easily welded to each other and yet exhibit the desired circuit-breaking performance. Development of such an electrode material is very difficult and expensive.

(3) A powerful electrode contact spring is required for minimizing the tendency of fusing of the electrodes, and the vacuum valve may be damaged due to the impact imparted thereto when the circuit breaker is actuated.

The above disadvantages in the vacuum circuit-breaker can be avoided when a tulip-shaped contact member providing a low electric resistance is used as one of the contacts thereof. In a composite circuit breaker comprising such a vacuum circuit-breaking part, main contacts of a closing switch part customarily employed in the art are disposed in parallel with the contacts of the vacuum circuit-breaking part provided for circuit-breaking purpose so that, in the circuit-making mode, the main contacts are closed prior to the closing of the contacts of the vacuum circuit-breaking part to conduct a short-circuit current. However, with such a prior art circuit breaker structure, the main contacts are opened subsequent to the opening of the contacts of the vacuum circuit-breaking part in the circuit-breaking mode. That is, the current-interrupting is also made by the main contacts and is not made by the contacts of the vacuum circuit-breaking part which is primarily provided for interrupting a large current. Therefore, a large current cannot be conducted and interrupted by the composite circuit breaker.

It is therefore a primary object of the present invention to provide an improved composite circuit breaker which can conduct and interrupt a large current.

In accordance with the present invention, a composite circuit breaker is provided which comprises a closing switch part disposed between a pair of conductors at a position relatively near a load apparatus, a vacuum circuit-breaking part disposed between the conductors at a position adjacent to the closing switch part but relatively remote from the load apparatus, an operating mechanism operating the making and breaking operation of the closing switch part and vacuum circuit-breaking part, and a delaying mechanism delaying the making and breaking operation of the vacuum circuit-breaking part operated by the operating mechanism relative to that of the closing switch part operated by the operating mechanism. Thus, according to the present invention, the closing switch part is engaged prior to the engagement of the vacuum circuit-breaking part in the circuit-making mode to conduct a large current through the circuit breaker, while the vacuum circuit-breaking part is disengaged subsequent to the disengagement of the closing switch part in the circuit-breaking mode to interrupt the large current being conducted through the circuit breaker.

Figure 3:
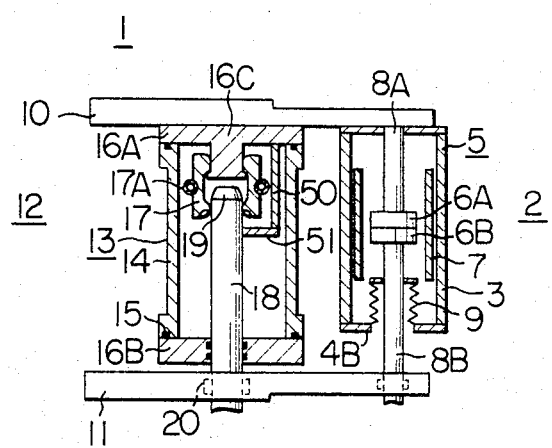
Figure 2:
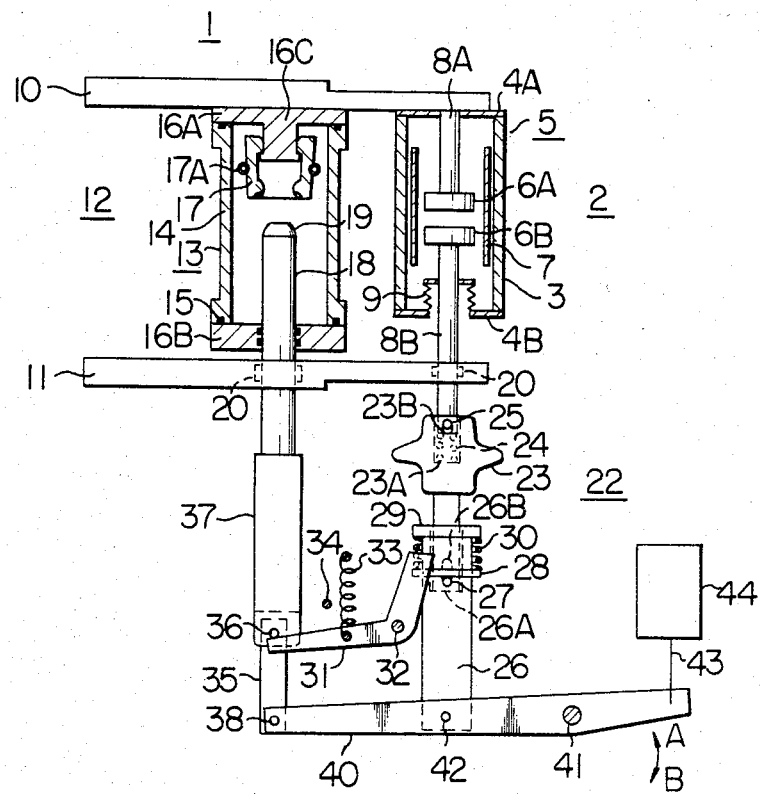
Figure 4:
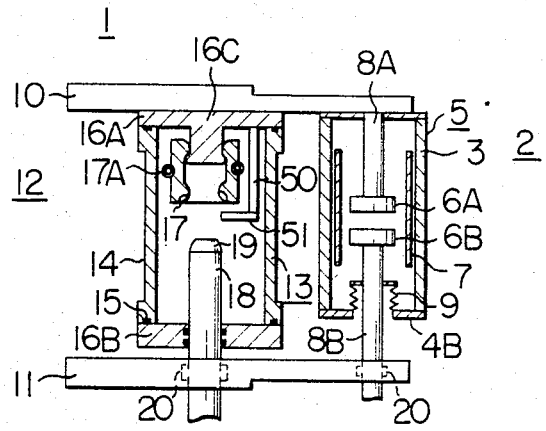

The above and other objects, features and advantages of the present invention will be apparent from the following detailed description of preferred embodiments thereof taken in conjunction with the accompanying drawings, in which:

FIGS. 1 and 2 are partly sectional, side elevation views respectively showing two states of a composite circuit breaker according to the present invention; and FIGS. 3 and 4 are partly sectional, side elevation views respectively showing two states of another embodiment of a composite circuit breaker according to the present invention.

Referring now to the drawings wherein like reference numerals are used throughout the various views and, more particularly, to FIGS. 1 and 2, according to these figures the composite circuit breaker 1 comprises a vacuum circuit-breaking part 2 which includes a vacuum envelope 5 formed by a cylinder 3 of an electrical insulator and an upper and a lower end plate 4A, 4B respectively covering the upper and lower end openings of the insulating cylinder 3. At least one pair of a stationary contact 6A and a movable contact 6B, movable toward and away from the stationary contact 6A, are disposed inside of the vacuum envelope 5. A metal vapor condensing shield 7 is disposed between the insulating cylinder 3 and the contacts 6A, 6B. This metal vapor condensing shield 7 is supported in position by the insulating cylinder 3 or upper end plate 4A. A stationary-side rod 8A and a movable-side rod 8B extend to the exterior of the vacuum envelope 5 from the other end face of the stationary and movable contacts 6A, 6B, respectively. A bellows 9 is connected between the movable-side rod 8B and the lower end plate 4B so that the movable-side rod 8B can be moved in its axial direction together with the bellows 9 while maintaining the vacuum. The stationary-side rod 8A is directly electrically connected at the other end thereof to an upper conductor 10, and the movable-side rod 8B is electrically connected at a portion adjacent to the other end thereof to a lower conductor 11 through a current collector 20. The upper and lower conductors 10, 11 are connected at their left-hand terminals to a power source and a load apparatus (not shown). A closing switch part 12 is disposed between the upper and lower conductors 10, 11 at a position nearer to the load apparatus than the vacuum circuit-breaking part 2.

The closing switch part 12 is arranged in parallel with the vacuum circuit-breaking part 2 and has a structure which will be described more fully hereinbelow. A closed vessel 13 is formed by a cylinder 14 of an electrical insulator and an upper and a lower end plates 16A, 16B covering the upper and lower end openings respectively of the insulating cylinder 14 through sealing members 15 interposed therebetween. The internal space of the closed vessel 13 is filled with SF6 gas. A stationary contact member 17 is mounted around a rod 16C extending from the upper end plate 16A toward the lower end plate 16B, and a spring 17A is mounted on the stationary contact member 17 to normally press the stationary contact member 17 against the rod 16C thereby supporting the stationary contact member 17 on the rod 16C. In FIG. 1, a movable contact member 18 extends at one end thereof toward and into the stationary contact member 17 and at the other end thereof to the exterior of the closed vessel 13. A coating 19 of, for example, an arc-resistive metal is provided on the opposing ends of the stationary and movable contact members 17, 18 to prevent such ends from being damaged by an arc generated when the closing switch part 12 is engaged to make the circuit. The insertion stroke of the movable contact member 18 inserted into the stationary contact member 17 after making initial engagement with the stationary contact member 17 is selected to be larger than the wipe stroke after the movable contact 6B makes engagement with the stationary contact 6A. The term "wipe stroke" is used herein to indicate the amount of deflection or compression stroke of a spring 24 (described later) which presses the movable contact 6B against the stationary contact 6A after the stationary and movable contacts 6A, 6B are brought into engagement with each other. The amount of compression stroke of the spring 24 is less than the stroke of relative engagement between the stationary and movable contact members 17, 18.

A sealing member 15 is interposed between the movable contact member 18 and the lower end plate 16B, and a current collector 20 is interposed between the movable contact member 18 and the lower conductor 11. Therefore, the movable contact member 18 is electrically connected to the lower conductor 11 through the current collector 20. An operating mechanism 22 is disposed beneath the lower conductor 11 to cause movement of the movable contact 6B and movable contact member 18 in the vacuum circuit-breaking part 2 and closing switch part 12, respectively.

The operating mechanism 22 has a structure which will be described below. An insulating operating rod 23 is formed with an internal groove 23A and an oblong slot 23B crossing with and extending through the groove 23A. A contact spring 24 is mounted in the bottom of the groove 23A. The other end of the movable-side rod 8B is inserted into the groove 23A, and a pin 25 fixed to the rod 8B is received in the oblong slot 23B. Therefore, the contact spring 24 functions to provide the force of engagement and to alleviate the force of impingement between the stationary contact 6A and the movable contact 6B which is urged toward and away from the stationary contact 6A. An operating rod 26 is also formed with an internal groove 26A and an oblong slot 26B crossing with and extending through the groove 26A. A pin 27 provided on the other end of the insulating operating rod 23 is received in the oblong slot 26B of the operating rod 26. The pin 27 engages a seat 28 slidably mounted on the outer surface of the operating rod 26, and a compression spring 30 is interposed between the seat 28 and a collar 29 fixedly mounted on the outer surface of the operating rod 26 to normally urge the pin 27 downward in FIG. 1.

A delaying lever 31 engaging at one end thereof with the pin 27 is rockably supported by a pivot pin 32. A return spring 33 is anchored at one end thereof to the other end portion of the delaying lever 31 which is engageable at the other end thereof with a pin 36. The return spring 33 is stretched to accumulate energy therein when the delaying lever 31 makes counterclockwise rotating movement around the pivot pin 32. A limiting pin 34 limits clockwise rotating movement of the delaying lever 31.

The pin 36 connects one end of a link 35 to the other end of an insulating operating rod 37 one end of which is connected to the other end of the movable contact member 18. The other end of the link 35 is connected by a pin 38 to one end of a main lever 40. This main lever 40 is rockably supported by a main pivot pin 41. The other end of the operating rod 26 is connected by a pin 42 to the portion of the main lever 40 between the main pivot pin 41 and the pin 38. The other end of the main lever 40 is connected by a rod 43 to an operating mechanism 44.

The composite circuit breaker 1 operates as follows:

In the current conducting condition shown in FIG. 1, the substantial portion of the main current flows through the closing switch part 12, and the proportion of the current flowing through the vacuum circuit-breaking part 2 is far less than that flowing through the closing switch part 12. When, under the above condition, the operating mechanism 44 is energized to urge the rod 43 in a direction as shown by the arrow A, the main lever 40 makes counter-clockwise rotating movement shown by the arrow A around the main pivot pin 41. The link 35, insulating operating rod 37 and movable contact member 18 are urged downward in FIG. 1, and, as a result, the movable contact member 18 is parted or moved away from the stationary contact member 17.

In this case, the operating rod 26 associated with the vacuum circuit-breaking part 2 is also urged downward in FIG. 1. However, the delaying lever 31 engaging the pin 27 does not permit downward movement of the movable contact 6B, and the compression spring 30 is merely compressed. With further counter-clockwise movement of the main lever 40, the pin 36 urges the other end of the delaying lever 31 to cause counter-clockwise rotating movement of the delaying lever 31 around the pivot pin 32. Finally, one end of the delaying lever 31 is disengaged from the pin 27, and the energy accumulated in both of the contact spring 24 and the compression spring 30 is released. The movable contact 6B is not supported now, and the members including the insulating actuating rod 23 and operating rod 26 are now urged downward in FIG. 1, with the result that the movable contact 6B is parted or moved away from the stationary contact 6A in a relation delayed relative to the parting movement of the movable contact member 18 from the stationary contact member 17 thereby establishing the open-circuit condition shown in FIG. 2.

The procedure for restoring the closed-circuit condition shown in FIG. 1 from the open-circuit condition shown in FIG. 2 is reverse to that described above. In this procedure, the main lever 40 is rotated clockwise or in the direction of the arrow B to bring the movable contact member 18 into engagement with the stationary contact member 17. Then, the movable contact 6B is brought into engagement with the stationary contact 6A by the function of the operating rod 26, and the contact spring 24 is compressed by the operating rod 26 to complete establishment of the closed-circuit condition. Immediately before the establishment of the closed-circuit condition, one end of the delaying lever 31 is engaged by the pin 27 again by the force of the return spring 33.

It will thus be seen that, according to the present invention, the movable contact member 18 is brought into engagement with the stationary contact member 17 before the movable contact 6B is brought into engagement with the stationary contact 6A in the circuit-making mode. This is because the stroke of engagement between the contact members 17, 18 is larger than that between the contacts 6A and 6B. On the other hand, in the circuit-breaking mode, the movable contact 6B is parted from the stationary contact 6A by the delaying mechanism after the movable contact member 18 is separated from the stationary contact member 17. Thus, the closing switch part 12, capable of withstanding flow of a large current, participates in the circuit-making operation, while the vacuum circuit-breaking part 2 operable with satisfactory circuit-breaking performance participates in the circuit-breaking operation. Therefore, the composite circuit breaker 1 of the present invention can conduct and interrupt a large current, for example, a load current of more than 4,000 A or a short-circuit current of more than 60,000 A.

According to the present invention, the closing switch part 12 is disposed between the conductors 10, 11 at a position nearer to a load apparatus than the vacuum circuit-breaking part 2, and the contact members 17, 18 are made of a metal such as copper having a high electrical conductivity. The electrical conductivity of the contact members 17, 18 is higher than that of the contacts 6A, 6B. The substantial portion of the main current flows through the contact members 17, 18 in the circuit-making mode, and the proportion of the current flowing through the contacts 6A, 6B is far less than the current flowing through the contact members 17, 18. Therefore, the contact spring 24 pressing the movable contact 6B against the stationary contact 6A need not have a large engaging force. Therefore, some of the members constituting the operating mechanism 22, for example, the members associated with and including the insulating operating rod 23 can be made small in size. Further, because of the fact that the force of impact imparted to the vacuum envelope 5 can be reduced, the possibility of damage to the vacuum envelope 5, for example, damage to the area between the insulating cylinder 3 and the end plates 4A, 4B can be minimized.

Further, the contact members 17, 18 passing the greater proportion of the main current are made of a material having a high electrical conductivity to generate a small quantity of heat, and the contacts 6A, 6B having a lower electrical conductivity and a slower rate of cooling pass the lesser proportion of the main current and hence generate also a small quantity of heat. Therefore, the total quantity of heat generated from these members is not large, so that the total rate of cooling is satisfactory.

Furthermore, because of the fact that the point of engagement between the contact members 17, 18 is disposed nearer to the upper conductor 10 than that between the contacts 6A, 6B in the embodiment shown in FIGS. 1 and 2, the length of the movable contact member 18 can be made large enough to prevent moving-out of the movable contact member 18 from the lower end plate 16B of the insulating cylinder 13 in the circuit-breaking mode.

Referring to FIGS. 3 and 4, a high-resistance member 50 having a contact 51 is fixed at one end thereof to the upper plate 16A of the insulating cylinder 13 in the closing switch part 12 and extends at the other end thereof toward the contact member 17 and 18 to engage at the end of the contact 51 with the movable contact member 18 when the movable contact member 18 is brought into engagement with the stationary contact member 17. The arrangement is such that the contact 51 remains in the position contacted to the contact member 18 through the high-resistance member 50 and upper end plate 16A to the upper conductor 10 even after the movable contact 6B is parted from the stationary contact 6A in the vacuum circuit-breaking part 2. The high-resistance member 50 limits the current value to a small value of about several amperes, and such a small current can be interrupted in the closing switch part 12 having a gas, for example, $SF_6$ gas filled therein, without the need for especially adding an arc extinguisher thereto. When the vacuum circuit-breaking part 2 operable with satisfactory circuit-breaking performance interrupts such a small current inductive, the current may be chopped to generate a high surge voltage. According to the present invention, any undesirable surge voltage is not generated since such a small inductive current is interrupted by the contact 51.

It will be understood from the foregoing detailed description that the present invention provides an industrially useful composite circuit breaker which can conduct and interrupt a large current.

What is claimed is:

1. A composite circuit breaker comprising:
   a vacuum circuit-breaking part including a vacuum envelope, at least one pair of contacts disposed within said vacuum envelope, and rods respectively extending to an exterior of said vacuum envelope from said contacts;
   a closing switching part disposed in parallel with said vacuum circuit-breaking part and including a closed housing having disposed therein at least one pair of contact members, a dimension of a stroke of engagement between said contact members is larger than that between said contacts, and contact rods extending to the exterior of said closed housing from said contact members, respectively;
   conductors respectively connecting said rods to said contact rods;
   operating means including operating rods respectively operatively connected with one of said rods and one of said contact rods associated with one of said conductors, said operating rods moving one of said contacts and one of said contact members so that said contacts and said contact members are respectively connected and disconnected; and
   delaying means including a delaying lever associated with said operating means, said delaying means delaying a connecting and disconnecting operation of said contacts latter than that of said contact members.

2. A composite circuit breaker as claimed in claim 1, wherein said closing switch part is disposed between said conductors at a position nearer to a load apparatus than said vacuum circuit-breaking part.

3. A composite circuit breaker as claimed in claim 1, wherein the electrical conductivity of said contact members is higher than that of said contacts.

4. A composite circuit breaker as claimed in claim 2, wherein the electrical conductivity of said contact members is higher than that of said contacts.

5. A composite circuit breaker as claimed in claim 1, wherein the closing position of said contact members is shifted in an axial direction from that of said contacts to a side of a stationary one of said contact members.

6. A composite circuit breaker as claimed in claim 2, wherein the closing position of said contact members is shifted in an axial direction from that of said contacts to a side of a stationary one of said contact members.

7. A composite circuit breaker as claimed in claim 3, wherein the closing position of said contact members is shifted in an axial direction from that of said contacts to a side of a stationary one of said contact members.

8. A composite circuit breaker as claimed in claim 4, wherein the closing position of said contact members is shifted in an axial direction from that of said contacts to a side of a stationary one of said contact members.

9. A composite circuit breaker as claimed in claim 1, wherein a resistance member with a contact is disposed in said closed housing to be connected at one end thereof to said conductor and to be disengageably engaged by said contact member operatively connected to said operating rod.

10. A composite circuit breaker as claimed in claim 2, wherein a resistance member with a contact is disposed in said closed housing to be connected at one end thereof to said conductor and to be disengageably engaged by said contact member operatively connected to said operating rod.

11. A composite circuit breaker as claimed in claim 3, wherein a resistance member with a contact is disposed in said closed housing to be connected at one end thereof to said conductor and to be disengageably engaged by said contact member operatively connected to said operating rod.

12. A composite circuit breaker as claimed in claim 4, wherein a resistance member with a contact is disposed in said closed housing to be connected at one end thereof to said conductor and to be disengageably engaged by said contact member operatively connected to said operating rod.

13. A composite circuit breaker as claimed in claim 5, wherein a resistance member with a contact is disposed in said closed housing to be connected at one end thereof to said conductor and to be disengageably engaged by said contact member operatively connected to said operating rod.

14. A composite circuit breaker as claimed in claim 6, wherein a resistance member with a contact is disposed in said closed housing to be connected at one end thereof to said conductor and to be disengageably engaged by said contact member operatively connected to said operating rod.

15. A composite circuit breaker as claimed in claim 7, wherein a resistance member with a contact is disposed in said closed housing to be connected at one end thereof to said conductor and to be disengageably engaged by said contact member operatively connected to said operating rod.

16. A composite circuit breaker as claimed in claim 8, wherein a resistance member with a contact is disposed in said closed housing to be connected at one end thereof to said conductor and to be disengageably engaged by said contact member operatively connected to said operating rod.

17. A composite circuit breaker as claimed in claim 1, wherein said closing switch part is disposed between said conductors at a position nearer to a load apparatus than said vacuum circuit-breaking part, and a size of said conductors connecting said rods to said contact rods is smaller than that of the conductors connecting said closing switch part and said load apparatus.

* * * * *